United States Patent
Kobi et al.

(10) Patent No.: US 7,996,500 B2
(45) Date of Patent: Aug. 9, 2011

(54) SYSTEMS AND METHODS FOR EXTENSIBLE DISTRIBUTED CONFIGURATION MANAGEMENT

(75) Inventors: Hayim Kobi, Lexington, MA (US); Jon Whitney, Cambridge, MA (US)

(73) Assignee: BMC Software, Inc., Houston, TX (US)

( * ) Notice: Subject to any disclaimer, the term of this patent is extended or adjusted under 35 U.S.C. 154(b) by 79 days.

(21) Appl. No.: 12/634,614

(22) Filed: Dec. 9, 2009

(65) Prior Publication Data
US 2011/0138025 A1    Jun. 9, 2011

(51) Int. Cl.
*G06F 15/177* (2006.01)
(52) U.S. Cl. .................. 709/220; 709/221; 709/223
(58) Field of Classification Search .......... 709/220, 709/221, 223, 222; 719/320; 717/102; 707/718, 707/755; 726/1
See application file for complete search history.

(56) References Cited

U.S. PATENT DOCUMENTS

| | | | |
|---|---|---|---|
| 2008/0005161 A1* | 1/2008 | Grealish et al. | 707/755 |
| 2008/0109542 A1* | 5/2008 | Ferri et al. | 709/222 |
| 2008/0256593 A1* | 10/2008 | Vinberg et al. | 726/1 |
| 2009/0083239 A1* | 3/2009 | Colgrave et al. | 707/718 |
| 2009/0144694 A1* | 6/2009 | Lin et al. | 717/102 |
| 2009/0300656 A1* | 12/2009 | Bosworth et al. | 719/320 |

* cited by examiner

*Primary Examiner* — Le Luu (57) ABSTRACT

Systems and methods for extensible distributed configuration management of computer resources are described. Examples include a computer system including a processing unit and a storage device that stores a model definition and one or more asset plug-ins (each of the one or more asset plug-ins configured to expose at least one asset object that represents a computer resource). The computer system further includes memory that stores an asset model created based at least in part on the model definition, and a network interface configured to deploy to at least one managed system a compatible asset plug-in (the model definition including at least one conditional reference to the compatible asset plug-in). If a condition specified within the asset model is satisfied the processing unit selects the compatible asset plug-in for deployment, the condition being defined within the model definition and designated as applicable to the at least one conditional reference.

18 Claims, 5 Drawing Sheets

SYSTEMS AND METHODS FOR EXTENSIBLE DISTRIBUTED CONFIGURATION MANAGEMENT

BACKGROUND

This disclosure relates generally to the field of automated configuration management of computer systems. As networks and the Internet in particular have continued to grow in size, so have datacenters housing servers and providing software applications to users across such networks. With servers and software applications numbering in the thousands, a large diversity of server and application types, and significant numbers of configuration elements associated with each server and application, managing both hardware and software resource configurations within datacenters has become challenging. To complicate matters further, these resources frequently are not statically configured, but are instead reconfigured on an as-needed basis, depending upon user demand and resource capacity.

In response to these demands, a number of configuration management software applications have been developed for automating the deployment, configuration and reconfiguration of datacenter resources, and for tracking deployed resource configurations. Because of the heterogeneous nature of a typical datacenter's resources, many configuration management products represent resources using an abstraction layer that presents the resources to the management software in a consistent manner, creating the appearance of a homogeneous environment. The abstraction layer enables the management software to operate on all resources using the same mechanisms, or to at least operate on resources of a same type using the same mechanisms. The abstraction layer thus helps to ensure consistent behavior of resources or resource types in response to management software operations, and provides a management software user with user interface representations of the resources that have a consistent look and feel.

Existing configuration management software abstraction layers are typically implemented using one of two approaches: script extensions and hard-coded/native extensions. Script extensions are programmed separately from the configuration management software and are executed on the managed systems. With script extensions, the configuration management software has the ability to interact with the remotely executed scripts (e.g., Bourne shell scripts, C shell scripts, Perl scripts, etc.). Scripts can be developed by either the provider or the user of the configuration management software to further extend the configuration management software's capabilities. Configuration parameters and/or commands are passed as arguments to a script that is remotely executed on a managed system. The results produced by the script when executed are similarly passed back to the configuration management software for appropriate processing. While script extensions provide a great deal of functional flexibility, they do not provide typing and naming of arguments and results data, cannot be deployed and/or localized, do not specify the applicability of specific configuration management parameter values to a resource, and do not support ad hoc reports. Also, script-based solutions are generally not well suited for providing abstraction layers for complex enterprise-level applications.

Hard-coded/native extensions also execute on the managed systems and communicate over a network with the configuration management software. These extensions are generally developed and maintained by the configuration management software developers. As a result, hard-coded/native extensions can take advantage of the full range of the configuration management system's capabilities, are strongly typed, can be deployed and localized, and can provide support for all available configuration management parameter options. However, hard-coded/native extensions are expensive to develop, are platform specific and thus not portable, are difficult to support and upgrade in large enterprise environments, and their releases are tied to configuration management software releases. Further, because a hard-coded/native extension's functionality is built into the extension, further functionality extensions cannot be developed and integrated into the configuration management software by the users.

SUMMARY

Systems and methods for extensible distributed configuration management of computer system resources are described herein. Example embodiments include a computer system that includes a processing unit and a storage device that stores at least one model definition and one or more asset plug-ins (each of the one or more asset plug-ins configured to expose at least one asset object that represents a computer resource). The computer system further includes memory that stores at least one asset model created based at least in part on the at least one model definition, and a network interface configured to deploy to at least one managed system a compatible asset plug-in of the one or more asset plug-ins (the at least one model definition including at least one conditional reference to the compatible asset plug-in). If a condition specified within the at least one asset model is satisfied the processing unit selects the compatible asset plug-in for deployment, the condition being defined within the at least one model definition and designated as applicable to the at least one conditional reference.

Other example embodiments include a method for managing a computer resource, the method including importing at least one model definition comprising at least one conditional reference to one or more asset plug-ins and further comprising a condition designated as applicable to the at least one conditional reference (a compatible asset plug-in of the one or more asset plug-ins being compatible with a managed system and further being configured to expose at least one asset object representing a computer resource) and transforming the at least one model definition into at least one asset model. The method further includes selecting the compatible asset plug-in for deployment to the managed system if a condition specified within the at least one asset model is satisfied and accessing the at least one asset object to perform operations on the computer resource.

Still other example embodiments include a computer-readable storage medium that includes software that causes a processor to perform the above-described method. Additional example embodiments include a networked computer system that includes a plurality of computers communicatively coupled, at least one of the plurality of computers programmed to perform at least a portion of the above-described method, wherein the entire method for managing resources of claim 7 is performed collectively by the plurality of computers.

Yet other example embodiments include a networked configuration management system including a management station that includes a processing unit, a storage device that stores at least one model definition and one or more asset plug-ins (each of the one or more asset plug-ins configured to expose at least one asset object), memory that stores at least one asset model created based at least in part on the at least one model definition, and a network interface configured to deploy to at least one managed system a compatible asset plug-in of the one or more asset plug-ins (the at least one model definition comprising at least one conditional reference to the compatible asset plug-in). The networked configuration management system further includes one or more managed systems (including the at least one managed system) that each includes a computer resource represented by one of the at least one asset objects, and a communication network that couples the management station to the one or more managed systems. If a condition specified within the at least one asset model is satisfied the processing unit causes the compatible asset plug-in to be deployed to the at least one managed system, the condition being defined within the at least one model definition and designated as applicable to the at least one conditional reference.

BRIEF DESCRIPTION OF THE DRAWINGS

FIG. 3 illustrates an example method for generating an asset model and for deploying a corresponding asset plug-in.

DETAILED DESCRIPTION

The present disclosure describes systems and methods for providing extensible distributed configuration management of computer system resources. The systems and methods described are implemented within a framework that enables a configuration management system's functionality to be extended and distributed to a wide variety of hardware and software resources.

Definitions

To facilitate the description of how such extensibility and distribution is achieved by the example systems and methods presented below, several system elements are defined as follows:

Resource—A hardware or software element associated with a managed computer system. Examples of hardware resources include, but are not limited to, server computers, disk drives, processors, and memory devices. Examples of software resources include, but are not limited to, operating systems and operating system elements, device drivers and application programs. Resource components may also be described as a resource. Thus, resources can reference other resources.

Asset Object—A software abstraction layer that represents a specific resource to the management software. For example, each server within an enterprise network may be a resource that is represented by a separate and distinct asset object (e.g., a server container asset object, explained in more detail below). Just as resources can reference other resources, asset objects can reference other asset objects. A deployed asset plug-in exposes one or more asset objects to the management software.

Asset Model—A structure that describes an asset object. An asset model represents a resource class, rather than a specific resource.

Model Definition—A description of a group or class of asset objects. A model definition may be imported by the management software and stored as an asset model.

Asset Plug-in—A deployable, platform-specific software module that executes on a managed computer system. A deployed asset plug-in executing on a managed system exposes one or more asset objects to the management software through an application program interface (API), enabling the management software to access and manipulate resources corresponding to the asset objects. An asset plug-in is deployed to a managed computer system by the management software.

System Overview

Figure 1:
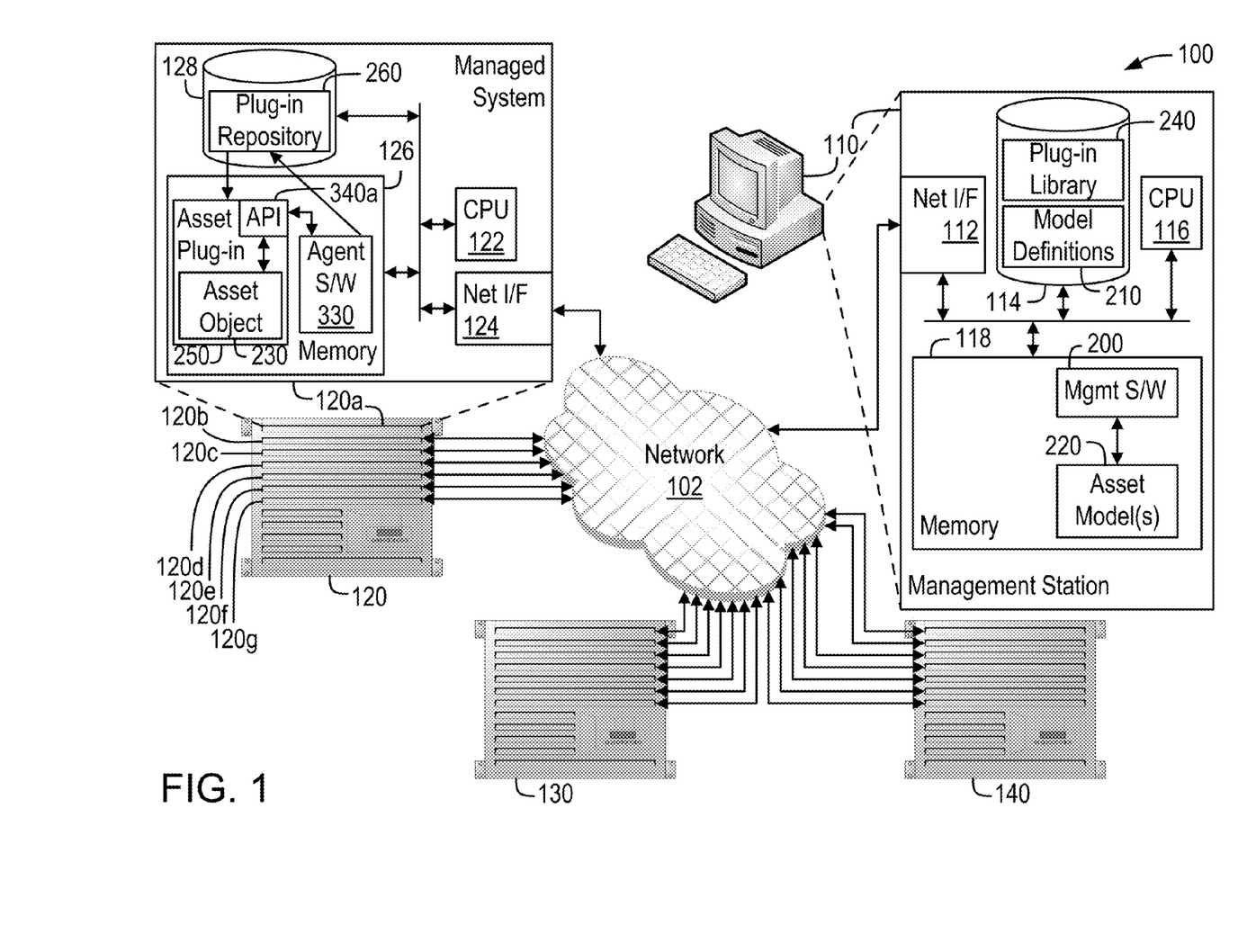
FIG. 1 illustrates an example system for providing extensible distributed configuration management.

The above-described elements are operated upon by the embodiments described herein to deploy to each managed system the software needed to access managed resources, to expose and access abstractions of the managed resources within a resource hierarchy, and to actively manage the resources. FIG. 1 illustrates an example configuration management system 100 that incorporates such elements to provide configuration management of a system that is both extensible and distributed. System 100 includes management station 110 coupled to network 102, which provides connectivity to various blade enclosures 120, 130 and 140. Each blade enclosure has installed within it one or more blade servers (e.g., blade servers 120*a* through 120*g* installed in enclosure 120), each a system managed by management station 110. Although the example system of FIG. 1 shows managed systems implemented as blade servers, any of a wide variety of computer systems may be managed using the systems and methods described, including stand-alone computer systems, client computer systems and mainframe computer systems, just to name a few examples.

Example management station 110 may be implemented using any of a variety of known hardware platforms (e.g., Intel and Advanced Micro Devices processor-based personal computers) and known operating systems (e.g., Linux® and Microsoft Windows®). (LINUX is a registered trademark of Linus Torvalds. WINDOWS is a registered trademark of the Microsoft Corporation.) While such hardware platforms and operating systems may include many different constituent components or modules, only those components and/or modules that are relevant to the discussion of the configuration management system are shown in FIG. 1 and described herein. Example management station 110 includes management software 200, which is loaded into memory 118 and executed by CPU 116, and which provides at least some of the configuration management functionality described herein. Management station 110 also includes persistent storage device 114 (e.g., a hard disk drive), used to store model definitions 210 and plug-in library 240.

Management software 200 imports model definitions 210, storing them as asset models 220 within memory 118. Each model definition includes a description of an asset object group or class, and may be encoded using any number of data description languages such as, for example, the extended markup language (XML). Examples of model definitions using XML are presented in more detail below. Model definitions 210 describe various asset model elements, and may also describe conditions that determine the applicability of one or more such asset model elements to each corresponding asset object 230. The asset models are maintained in memory 118 and are applied when an asset object 230 is accessed. The conditions specified within the asset model(s) 220 are applied at that time, for example, to determine which conditional asset model elements of asset object 230 are available and/or accessible.

When a resource is identified that needs to be accessed and/or managed by example management software 200, a compatible asset plug-in within plug-in library 240 is identified and deployed by management station 110 to a managed system. The deployed plug-in is transferred via network interface 112 and network 102 to the managed system that includes the identified resource (e.g., managed system 120a). As with management station 110, managed systems may also be implemented using any of a variety of known hardware platforms (e.g., Cell, PowerPC® and UltraSPARC® processor-based blade servers) and known operating systems (e.g., AIX®, HP-UX® and Linux®). (POWERPC and AIX are registered trademarks of the International Business Machine Corporation. ULTRASPARC is a registered trademark of SPARC International, Inc. HP-UX is a registered trademark of the Hewlett-Packard Development Company.) Further, a server enclosure may include blade servers with the same hardware configuration and/or operating system, or alternatively may include a mix of blade servers with at least some blade servers having different hardware configurations and/or operating systems.

Continuing to refer to FIG. 1, example managed system 120a includes agent software 330, which is loaded into memory 126 and executed by CPU 122, and which also provides at least some of the configuration management functionality described herein. Managed system 120a also includes persistent storage device 128 (e.g., a hard disk drive), where plug-in repository 260 is stored. Agent software 330 receives, via network interface 124, the asset plug-in deployed by management station 110 (e.g., asset plug-in 250), registers the plug-in with the managed system's operating system, and stores the received plug-in within plug-in repository 260. For example, the plug-in may be deployed as a dynamically linked library (DLL) file that is stored in a file system directory maintained on persistent storage device 128 and is registered with the operating system executing on managed system 120a (e.g., Microsoft Windows®). Asset plug-in 250 exposes an associated resource of managed system 120a as asset object 230, which may be accessed by management software 200 via network 102.

When management software 200 performs an operation on a resource associated with deployed asset plug-in 250, a call is initiated to a function implemented by plug-in 250. Such a call may be executed, for example, as a remote procedure call (RPC). The RPC is received and serviced by agent software 330 executing on managed system 120a, which subsequently initiates a local call to the requested function. In at least some examples of configuration management system 100, if none of the functions of plug-in 250 have previously been called since the most recent boot of managed system 120a, the call to the requested function causes the operating system to load the required plug-in into memory 126. Once loaded, the requested plug-in function is called and executed, and the results of the operations performed by the function are subsequently transmitted back to management software 200. In at least some examples of configuration management system 100, plug-in 250 remains in memory 126 to service subsequent function calls from management software 200.

By deploying the plug-ins to the managed systems, the processing overhead associated with plug-in 250 operations is offloaded from management station 110 and distributed across the managed systems (e.g., systems 120, 130 and 140). Further, by implementing the asset object functionality in deployable asset plug-ins, such plug-ins may be developed, released and maintained independently from the management software 200. Plug-ins thus facilitate extending the functionality of management software 200 without modifying the management software itself. Such functionality can be extended to additional resources, or to new functions on already-managed resources, by adding new model definitions and asset plug-ins, or by modifying existing model definitions and asset plug-ins.

The Object Framework

Figure 2:
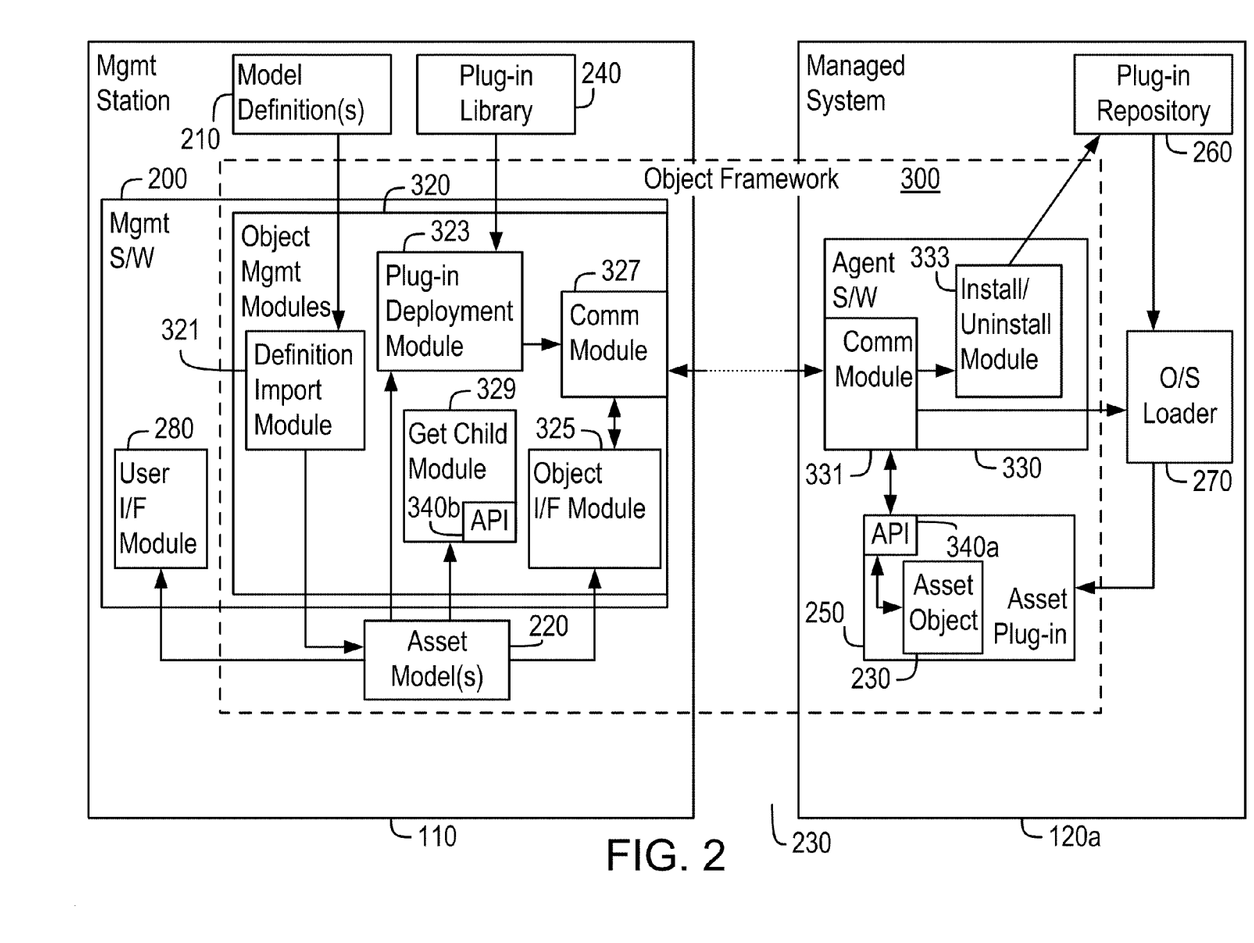
FIG. 2 illustrates an example object framework for creating and distributing asset plug-ins and for exposing and accessing asset objects.

To support the creation and manipulation of an asset object, as well as the deployment and manipulation of the associated asset plug-ins, object framework 300 of FIG. 2 may be implemented within management software 200. The infrastructure provided by object framework 300 includes object management modules 320, which import asset models, deploy asset plug-ins, and provide access to asset objects operated on by other modules (not shown) within management software 200. Object framework 300 also includes agent software 330, which provides additional support for the deployment of asset plug-ins and access to the asset objects, and also includes the asset plug-ins themselves (e.g., asset plug-in 250). Object framework 300 defines an API common to all asset plug-ins through which management software 200 may access resources via the asset objects. Although object framework 300 does not include model definitions 210, the syntax used to define the various elements within the model definitions is a part of object framework 300. Such syntax (such as that described below with respect to the XML example of Table 1) is incorporated into the processing of model definitions 210 and implemented by definition import module 321 to produce asset models 220 of object framework 300.

Figure 3:
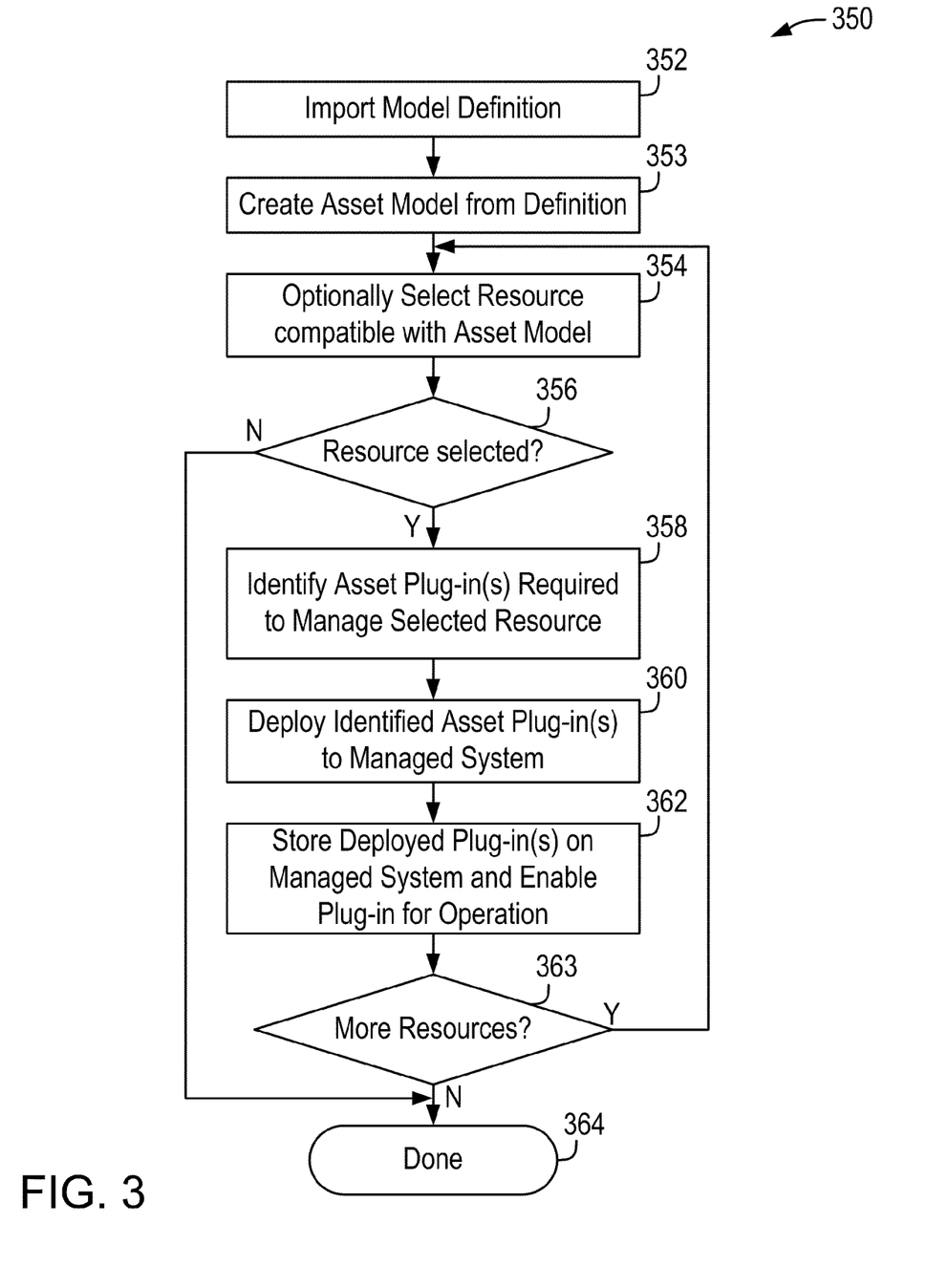

Referring now to both object framework 300 of FIG. 2 and method 350 of FIG. 3 implemented by the framework, definition import module 321 of framework 300 imports a model definition 210 (block 352, FIG. 3). This model definition may be implemented, for example, as a text file stored within management station 110 (e.g., on persistent storage device 114 of FIG. 1). Model definition 210 describes asset model elements such as valid data types, valid asset object types, valid child asset object types, valid attributes and actions for a given asset object type, and references to platform-specific plug-ins and to localized strings. As previously noted, model definition 210 may also describe conditions that can be used to determine whether specific attributes, references and/or actions of the asset model are applied when operations are performed on a resource via its corresponding asset object 230. Conditions included in model definition 210 may also operate to determine whether an asset object 230 is accessible at all. As will be described in detail below, such conditions may operate to prevent access to the asset object by not presenting the user with the option to access any of the operations or elements associated with a particular asset object if the conditions are not satisfied.

In the examples described, model definition 210 is encoded using XML, though any suitable data description language may be used for such encoding. These examples take advantage of the lack of pre-defined tags within XML, utilizing user-defined tags to identify the various attributes, references, actions and conditions described within the model definition. Table 1 shows an example of a model definition for a Unix-User asset model encoded using XML.

TABLE 1

Example of an XML-based model definition

```xml
<?xml version="1.0" encoding="UTF-8" ?>
<model xmlns="http://www.bladelogic.com">
<!--
model conditions
-->
    <condition_list>
        <condition name="Unix" display_string="${Condition.Unix}">
            <condition_element>
                <property_equals propertyName="OS" propertyValue="Linux" />
            </condition_element>
            <condition_element>
                <property_equals propertyName="OS" propertyValue="Solaris" />
            </condition_element>
        </condition>
        <condition name="rhas4_ppc64" display_string="${Condition.rhas4_ppc64}">
            <condition_element>
                <property_equals propertyName="BUILD_ENVIRONMENT"
                    propertyValue="LinuxRedHatAS4-ppc64" />
            </condition_element>
        </condition>
        <condition name="solaris8_sparc" display_string="${Condition.solaris8_sparc}">
            <condition_element>
                <property_equals propertyName="BUILD_ENVIRONMENT"
                    propertyValue="Solaris8-sparc" />
            </condition_element>
        </condition>...
    </condition_list>
<!--
class definitions
-->
    <class root="true" name="UnixUsers" display_string="${Class.UnixUsers}">
        <applicability>
            <applicability_condition name="rhas4_ppc64" />
            <applicability_condition name="solaris8_x86" />
        </applicability>
        <children_types>
            <child_type>UnixUser</child_type>
        </children_types>
    </class>
    <class root="false" name="UnixUser" display_string="${Class.UnixUser}">
        <applicability>
            <applicability_condition name="Unix" />
        </applicability>
<!--
UnixUser class attributes
-->
        <attributes>
            <attribute_list>
<!--
account home directory
-->
                <attribute name="homeDirectory" type="String"
                    display_string="${UnixUser.attribute.homeDirectory}" />
<!--
account description
-->
                <attribute name="description" type="String"
                    display_string="${UnixUser.attribute.description}" />
<!--
numerical primary group id
-->
                <attribute name="primaryGID" type="Integer"
                    display_string="${UnixUser.attribute.primaryGID}" />
<!--
primary group name
-->
                <attribute name="primaryGroupName" type="String"
                    display_string="${UnixUser.attribute.primaryGroupName}" />
<!--
supplementary group names
-->
                <attribute name="groupNames" type="List[String]"
                    display_string="${UnixUser.attribute.groupNames}" />
<!--
The number of days after a password expires until
the account is permanently disabled. A value of 0
disables the account as soon as the password has
expired, and a value of −1 disables the feature. The
```

TABLE 1-continued

Example of an XML-based model definition

```
default value is −1.
-->
                <attribute name="inactiveLimit" type="Integer"
                        display_string="${UnixUser.attribute.inactiveLimit}" />
<!--
date of last password change
-->
                <attribute name="lastChange" type="Date"
                        display_string="${UnixUser.attribute.lastChange}" />
            </attribute_list>
        </attributes>
<!--
UnixUser class actions
-->
        <actions>
            <action name="updatePassword"
                    display_string="${UnixUser.action.updatePassword}" is_deployable="true">
                <parameters>
                    <parameter name="newPassword" type="EncryptedString" display_string=
                        "${UnixUser.action.updatePassword.parameter.newPassword}" />
                </parameters>
            </action>
        </actions>
    </class>
<!--
Asset implementation plug-in references
-->
    <References>
        <AssetImpl>
            <applicability applicability_condition name="rhas4_ppc64" />
            <plugin_libFilePath>unixuserspluginrhas4ppc6.so</plugin_libFilePath>
        </AssetImpl>
        <AssetImpl>
            <applicability applicability_condition name=" solaris8_x86" />
            <plugin_libFilePath>unixuserspluginsolaris8x86.so</plugin_libFilePath>
        </AssetImpl>
    </References>
</model>
```

The example model definition in Table 1 shows a list of conditions defined for the asset model, the definition of the two asset object classes "UnixUser" and "UnixUsers," various attributes associated with the UnixUser class, an action defined for the UnixUser class, and references to potentially applicable plug-ins for the model. The conditions can be used to qualify the various element definitions within the model, including the class definitions. A condition qualifies a model element by including within the element an "applicability" child element that itself includes one or more "applicability_condition" child elements. The conditions included within the applicability element are logically OR'd together (in the absence of an express logical operator), and a model element so qualified will be available within a corresponding asset object if one or more of the conditions are satisfied. In other example embodiments, various express logical operators may be used to create more complex combinations of conditions, including AND, OR and XOR operators.

Continuing to refer to Table 1, the UnixUsers class is the root class of the model definition, is qualified by the applicability conditions "rhas4_ppc64" and "solaris8_sparc," and operates as the definition of the UnixUsers asset model. The UnixUser class, defined as a child class of the UnixUsers class, is a non-root class of the model definition that is qualified by the "Unix" applicability condition. A UnixUsers resource will thus be accessible through a corresponding UnixUsers asset object if the "BUILD_ENVIRONMENT" property equals one of the values specified for one of the listed conditions (Red Hat® Linux AS version 4 for a 64-bit PowerPC® system or Solaris® version 8 for a SPARC® system). (RED HAT is a registered trademark of Red Hat, Inc. SOLARIS is a registered trademark of Sun Microsystems, Inc. SPARC is a registered trademark of SPARC International, Inc.) Similarly, one or more UnixUser asset objects may be accessible as child objects of the UnixUsers asset object if the "OS" property equals either "Linux" or "Solaris." In at least some examples of configuration management system 100, the properties used to evaluate the conditions are defined within a container asset object that includes the UnixUsers asset object. A container asset object represents a top-level construct that includes other asset objects within an asset object hierarchy. For example, a server may be represented by a server asset object that operates as the container asset object.

Referring again to FIGS. 2 and 3, when a model definition is imported by definition import module 321, the model definition may be converted into a format that is better suited for random access by management software 200. This conversion of the imported definition model results in the creation of the corresponding asset model(s) 220 (block 353, FIG. 3). In at least some examples of management software 200, asset model(s) 220 conforms to the Document Object Model (DOM). However, definition import module 321 may be configured to produce an asset model(s) 220 that conforms to any number of other suitable data description models. Such data description models may include those defined under the Simple API for XML (SAX) or under the Virtual Token Descriptor for eXtensible Markup Language (VTD-XML), just to name two examples.

Once asset model(s) 220 has been generated, managed systems resources are selected (block 354) that are compatible with the model's available plug-ins, as indicated in the References section of asset model(s) 220 (see Table 1). A resource may be considered "compatible" with a plug-in if the model definition references a plug-in implementation that is compatible with the hardware and operating system of the managed system that includes the resource. The selection of a compatible resource may be performed by a user, for example, by selecting a resource from a list of resources compatible with the newly generated model and recognized by the system, but to which a plug-in has not yet been deployed. The list of compatible resources may be derived from a list of system resources produced using any of a number of known automated discovery processes (e.g., using the automatic discovery feature of the Simple Network Management Protocol), or may be produced manually by a management station user.

If a compatible resource is selected (block 356), one or more plug-in implementations (e.g., plug-in 250) are identified that are compatible with the selected resource and are needed to manage the resource (block 358). Referring again to the XML example of Table 1, the available plug-ins are defined within "AssetImpl" elements of the "References" section of the model definition (e.g., as UNIX® shared object libraries). (UNIX is a registered trademark of the American Telephone and Telegraph Company.) In at least some example embodiments a compatible plug-in is identified within model(s) 220 as a plug-in corresponding to a satisfied applicability condition.

In the XML example of Table 1, the identified plug-in can be one of two plug-ins: a plug-in for a PowerPC®-based managed system running a Red Hat® Linux AS version 4 operating system, or a plug-in for a SPARC®-based managed system running a Solaris® version 8 operating system. Thus, for example, if the a UnixUsers resource of a Power PC running Red Hat Linux Advanced Server version 4 is to be managed, the applicability condition "rhas4_ppc64" would be met and the plug-in "unixuserspluginrhas4ppc6.so," implemented as a UNIX shared library, would be deployed. The path to the file may be based, for example, on a known path combined with the applicability conditions. For example, the shared library may be located in a path such as "/implementations/rhas4_ppc64/unixuserspluginrhas4ppc6.so."

The identified asset plug-in(s), which each provides access to a corresponding resource, are retrieved from plug-in library 240 by plug-in deployment module 323 and forwarded to communication module 327. Communication module 327 subsequently deploys the plug-in to agent software 330 running on managed system 120a (block 360). Once received by communication module 331 of agent software 330, the plug-in is forwarded to install/uninstall module 333, which stores the received plug-in within plug-in repository 260 and registers the plug-in with the managed system's operating system (not shown), thus enabling the asset plug-in for operation (block 362). When the management software subsequently issues a remote procedure call to the deployed asset plug-in as previously described, operating system loader 270 loads the received plug-in into memory as asset plug-in 250, where it remains until the plug-in is uninstalled by install/uninstall module 333 or managed system 120a is rebooted.

If additional resources compatible with newly generated model(s) 220 remain (block 363) and are selected (blocks 354 and 356), the process is repeated (blocks 354 through 363) until plug-ins have been deployed for all selected resources compatible with the newly generated model. When no more compatible resources are selected (block 356) or none remain for selection (block 363), the method 350 completes (block 364). Although the above-described example method 350 is presented in the context of a newly generated model(s) 220, other variations are contemplated wherein plug-ins are deployed for newly identified resources using existing models 220 (e.g., by omitting blocks 352 and 353 of method 350).

As previously noted, asset objects can be nested, resulting in complex combinations of asset objects that may or may not be applicable to a particular managed system. A model definition may thus include references to other models, some of which may be applicable to Linux operating systems, while others may be applicable to Microsoft Windows operating systems. When asset objects are generated and exposed by the deployed plug-ins, only those resources that are compatible with the configuration of the managed system (e.g., systems with matching OS and BUILD_ENVIRONMENT environment variables) are presented and accessible. For example, a server container model definition may reference the UnixUsers model definition, even though the server container model definition itself may not be conditioned at all, thus allowing it to be associated with either a Linux or a Microsoft Windows-based system. Nonetheless, because the UnixUsers class (see Table 1) includes an applicability condition that requires either a Red Hat® Linux AS version 4 operating system running on a 64-bit PowerPC®, or a Solaris® version 8 operating system running on a SPARC® workstation, the management software will not show UnixUsers as a resource that can be managed for a Windows-based server. This is because the applicability condition for the defining class of the UnixUsers model definition (and thus of the corresponding asset model) is not met by the container asset object representing the Windows-based server. Further, the server object would not be able to recognize a request to access a UnixUsers resource (via the corresponding UnixUsers asset object) since the required plug-in will not have been deployed to the server. This is also because of a failure to meet a required applicability condition, this time applicable to the asset implementation elements defined within the UnixUsers model's reference section.

Figure 4:
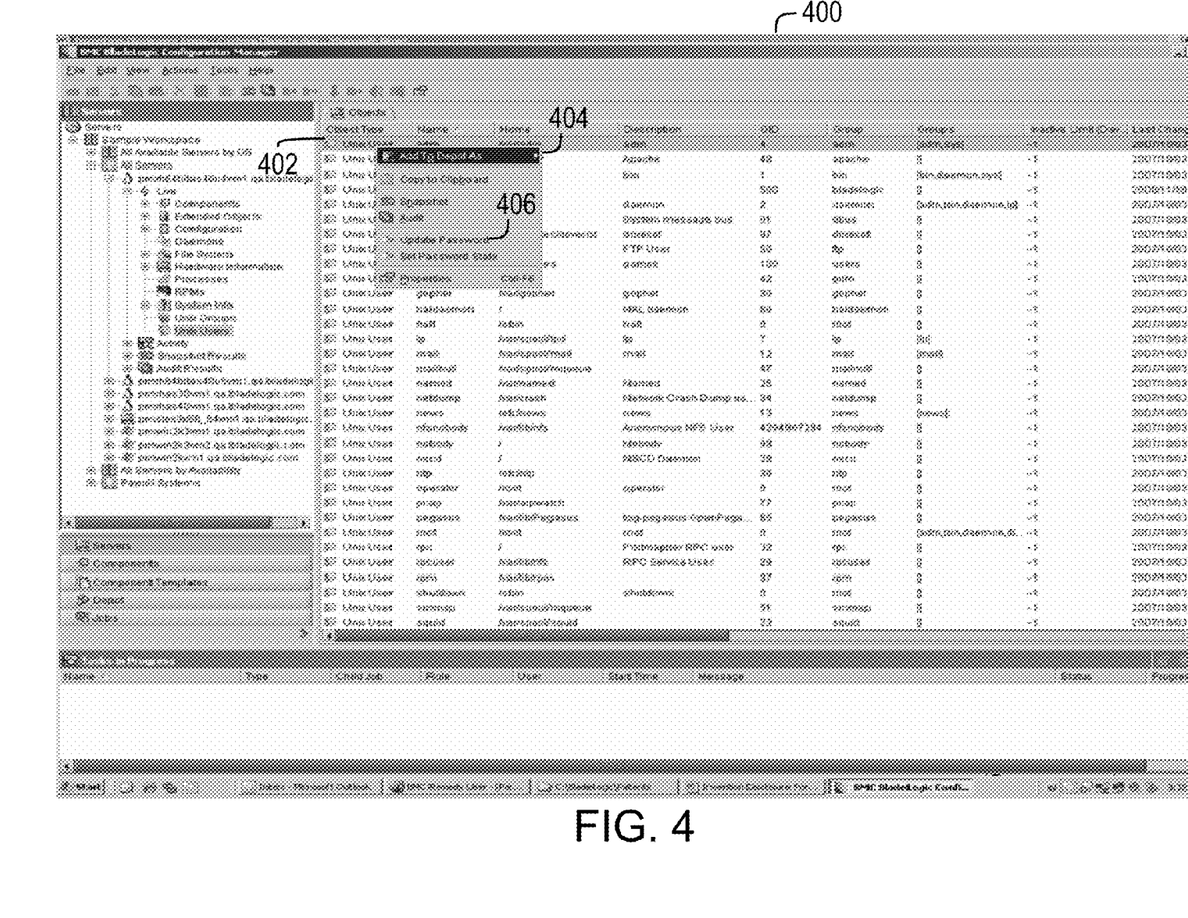
FIG. 4 shows a screenshot illustrating an example of user interface options driven by the asset model.

Similarly, conditional attributes and actions defined within an asset model may only be made accessible to the user by user interface software 280 if any applicable corresponding conditions are satisfied. In this manner the model definitions may be used to drive the user interface options and selections that are presented to a configuration management system 100 user. For example, FIG. 4 illustrates an example of a user interface display 400 where data retrieved by the UnixUsers asset plug-in is displayed, and where a right mouse click has been performed on a listed UnixUser asset object 402. A drop-down menu 404 is displayed that includes the "Update Password" option 406. The option is displayed as a direct result of the "Unix" applicability condition of the UnixUser class being satisfied, thus enabling the "updatePassword" action defined within the UnixUser class to be made accessible to the user as the Update Password menu option.

As previously described, the deployed asset plug-ins generate and expose the asset objects and provide the functionality required by the management software to access the associated resource. As a result, agent software 330 of object framework 300 need provide very little functionality beyond receiving, installing and uninstalling asset plug-ins and relaying information between the asset plug-ins and management software 200. In at least some examples of management system 100, agent software 330 responds to one or more inquiries from management software 200 requesting basic system information, such as the managed system's operating system and build environment. Such an inquiry may be sent by management software 200 prior to the deployment of plug-ins to the managed system in order to have enough information to apply the conditions needed to identify and deploy the plug-ins that are specific to the managed system on which agent software 330 executes. By limiting the functionality of agent software 330 to a minimal set of capabilities, agent software maintenance across multiple platforms is simplified. This is due to the fact that once agent software 330 has been ported to operate under a specific operating system and build environment, no further modifications to the agent software are needed, other than to correct errors (i.e., "bugs"). Any further development is otherwise directed to modifying agent software 330 to operate under new operating system releases and builds. Because of the generic nature of the operations performed by agent software 330, such modifications will generally be easily implemented, and sometimes may not be required at all.

In at least some examples of management system 100, object framework 300 provides access to resources through a common API that defines four basic functions used to access all asset objects, and thus to the corresponding resources, within management system 100. Three of these functions are implemented by asset plug-in 250 (represented by API 340*a* of FIGS. 1 and 2) and are accessed via object interface module 325, while the fourth (represented by API 340*b* of FIG. 2) is implemented locally within management software 200. The functions are:

1. Retrieve Assets: Retrieves all data for one or more asset objects, each associated with one or more resources. Implemented by asset plug-in 250.

2. Modify Assets: Modifies one or more asset object attributes. Implemented by asset plug-in 250.

3. Call Actions on Assets: Commands a plug-in to perform an operation on a resource, and/or forwards a command to a resource. Implemented by asset plug-in 250.

4. List Asset Children: Generates a list of child asset objects defined within the asset object responding to the function call. Implemented by get child module 329 of management software 200, which retrieves the information from asset model(s) 220.

Each of the above-listed functions may require one or more arguments, depending upon the operation being performed. For example, a Modify Assets function may require specifying the attribute being modified and the value used to update the attribute as arguments to the function. The arguments may be provided to the function as a single text string that is parsed by the receiving function. In this manner, the functions may be called using a single consistent argument type regardless of the number and types of arguments that may be required by an object-specific operation (e.g., an operation specified using the Call Actions on Asset function). As will be shown below, some of these arguments may be constructed from fixed data encoded with a model definition corresponding to the asset object 230 being accessed. Object interface module 325 constructs the argument strings as needed based upon asset model(s) 220.

The use of a single text string to represent asset plug-in function arguments also simplifies nesting asset objects. With nested asset objects, an argument string may be modified or augmented by a first asset plug-in and then forwarded to a second asset plug-in, invoked by the first asset plug-in, without having to use function calls specific to each object. Instead, a single uniform function call is used to invoke the functions implemented by both asset plug-ins. Object nesting may thus be supported by a generic call function implemented within a plug-in that may be used to call any other plug-in function installed on the managed system where the plug-ins are installed. Such asset object nesting, when combined with the capability of deploying corresponding asset plug-ins for later use, enables the use of command pattern constructs within configuration management system 100. Using such constructs, an encapsulation asset object may be defined that includes a second asset object. A function implemented by a corresponding deployed encapsulation asset plug-in is subsequently invoked by management software 200. The encapsulation asset plug-in in turn invokes, and supplies some or all of the arguments required by, a function within a second deployed asset plug-in that performs the requested operations based upon the supplied arguments. In this manner, an encapsulation object can be provided that performs a single predetermined operation on a resource without requiring a configuration management system 100 user to provide an argument list. Such a list may be required, for example, by an asset plug-in that is designed to provide a full suite of operations applicable to a managed resource.

Object framework 300, by providing asset objects that are exposed using a single common interface, enable the high-level functionality provided by configuration management system 100 to be applied to most if not all of the resources managed by the system. Such high-level functionality may include security monitoring and enforcement, auditing, policies compliance, and snapshot acquisition and storage, just to name a few examples. Further, object framework 300 enables configuration management system 100 users to create custom asset models and plug-ins that conform to the common API, and thus the existing high-level system functionality can be extended to additional resources through such custom plug-ins and the resulting asset objects they expose.

The above-described object framework 300 provides a configuration management system 100 user with a number of useful capabilities. For example, although the arguments provided in the plug-in function calls, and the results received back, are formatted as string data, both the arguments and results are mapped to attributes with types defined by the model definition. These attribute type definitions are encoded within the asset model and enable management software 200 to perform functions such as data range validation (e.g., whether an attribute value is a valid date). The attribute type definitions also facilitates ad-hoc report generation, since any attribute selected for a report at management station 110 can be properly formatted based upon the type definitions encoded within each asset model 220.

Object framework 300, by centralizing the definition of asset objects, also provides for the centralized localization of strings, enabling the object framework to support the use of asset plug-ins that support multiple languages. Such localization can be encoded within the model definition using conditional references in a manner similar to that described for the asset plug-in selection. These references enable the determination of the proper path to the localized strings associated with the asset object based upon the environment variables stored within the container asset object (e.g., a LOCALE environment variable within a server container asset object). Information generated by an asset object may thus be presented in the desired language using the localized strings stored in the path determined by the conditional reference within the corresponding asset model.

Further, asset model attributes are not platform specific, and thus the asset models do not require updates to their attributes structure to accommodate new platforms. Once a plug-in is available for a new platform, the model definition is updated to include a conditional reference to the new plug-in, and the new plug-in is deployed as described above. Such updates are transparent to management software 200, as the interface to the asset object is defined by the common API regardless of which plug-in is responding to the functions calls from management software 200, and the asset attribute definitions themselves remains unchanged. In this manner the asset objects remain portable across all platforms that execute plug-ins that comply with the common API.

Computer System Implementations

Figure 5:
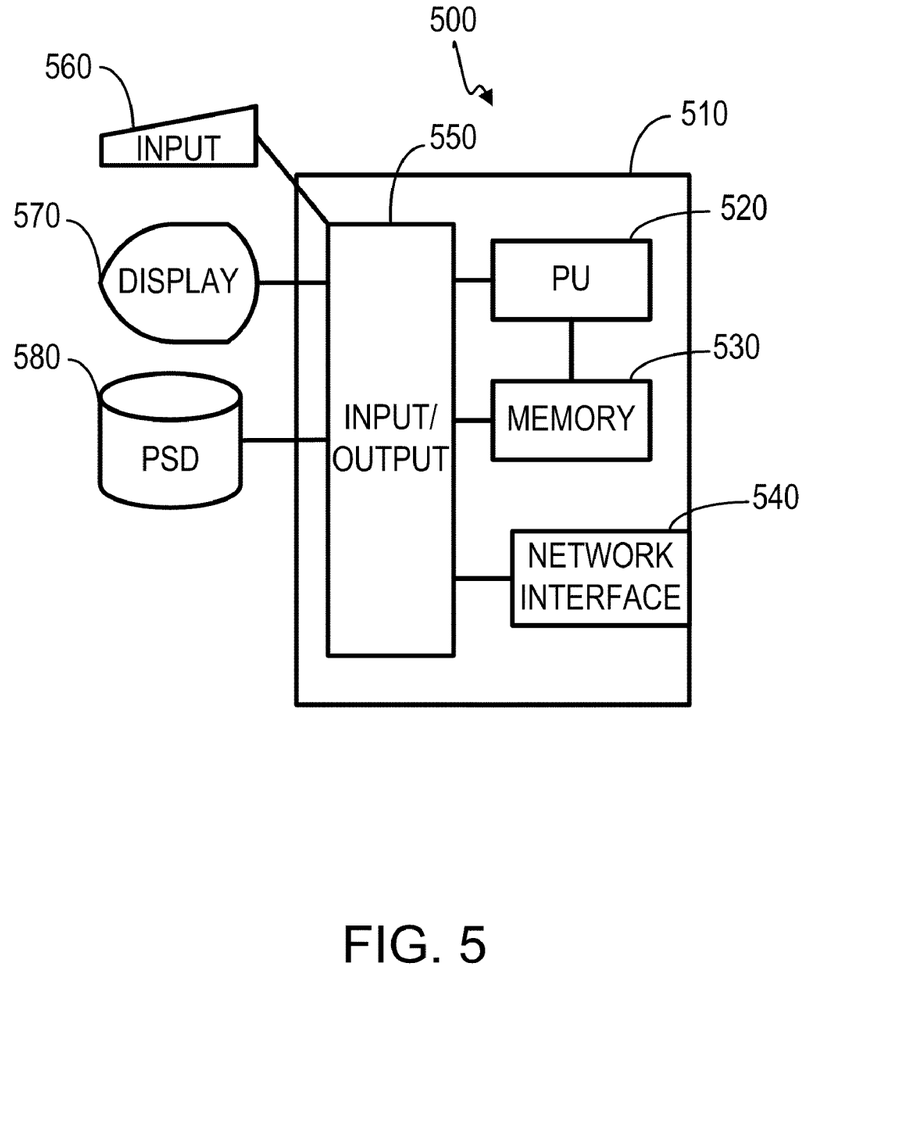
FIG. 5 illustrates an example of a computer system suitable for use as a management station and/or a managed system.

Referring now to FIG. 5, an example computer system 500 is shown. The example computer system may be used as a configuration management station (e.g., management station 110 of FIG. 1), and one or more example computer systems 500 may be included in a blade chassis (e.g., managed systems 102a-102g in FIG. 1). Example computer system 500 may include a programmable control device 510 which may be optionally connected to input 560 (e.g., a keyboard, mouse, touch screen, etc.), display 570 or persistent storage device (PSD) 580 (sometimes referred to as direct access storage device DASD). Also, included with programmable control device 510 is a network interface 540 for communication via a network with other computing and corporate infrastructure devices (see, e.g., FIG. 1). Note that network interface 540 may be included within programmable control device 510 or be external to programmable control device 510. In either case, programmable control device 510 will be communicatively coupled to network interface 540. Also note that persistent storage unit 580 represents any form of non-volatile storage including, but not limited to, all forms of optical and magnetic storage elements including solid-state storage.

Programmable control device 510 may be included in a computer system and be programmed to perform methods in accordance with this disclosure (e.g., example method 350 illustrated in FIG. 3). Programmable control device 510 includes a processing unit (PU) 520, input-output (I/O) interface 550 and memory 530. Processing unit 520 may include any programmable controller device including, for example, processors of an IBM mainframe (such as a quad-core z10 mainframe microprocessor). Alternatively, in non mainframe systems examples of processing unit 520 include the Intel Core®, Pentium® and Celeron® processor families from Intel and the Cortex and ARM processor families from ARM. (INTEL CORE, PENTIUM and CELERON are registered trademarks of the Intel Corporation. CORTEX is a registered trademark of the ARM Limited Corporation. ARM is a registered trademark of the ARM Limited Company.) Memory 530 may include one or more memory modules and include random access memory (RAM), read only memory (ROM), programmable read only memory (PROM), programmable read-write memory, and solid state memory. One of ordinary skill in the art will also recognize that PU 520 may also include some internal memory including, for example, cache memory.

In addition, acts in accordance with the method of FIG. 3 may be performed by an example computer system 500 including a single computer processor, a special purpose processor (e.g., a digital signal processor, "DSP"), a plurality of processors coupled by a communications link or a custom designed state machine, or other device capable of executing instructions organized into one or more program modules. Custom designed state machines may be embodied in a hardware device such as an integrated circuit including, but not limited to, application specific integrated circuits ("ASICs") or field programmable gate array ("FPGAs").

Storage devices, sometimes called "memory medium," "computer-usable medium" or "computer-readable storage medium," are suitable for tangibly embodying program instructions and may include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices. Also, XML was discussed in the embodiments disclosed herein. However, those of ordinary skill in the art will recognize that information may also be maintained as structured text, binary object data (e.g., binary data structures), HTML or other forms of storing data.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as network 102 and/or a wireless link.

Although the examples described include software executing on individual, self-contained physical computers, software that implements the functionality described herein is not limited to such physical computers. Those of ordinary skill in the art will recognize that other computer system implementations may be suitable for executing software that implements at least some of the functionality herein (e.g., management software 200 of FIG. 1). These implementations may include virtualized computer systems (e.g., systems implemented using VMware® Workstation software by VMware), and distributed computer systems (e.g., diskless workstations and netbooks), just to name a few examples. (VMWARE is a registered trademark of VMware, Inc.) All such implementations and variations of a computer system are contemplated by the present disclosure.

Conclusion

The above discussion is meant to illustrate the principles of at least some example embodiments of the claimed subject matter. Various features are occasionally grouped together in a single embodiment for the purpose of streamlining the disclosure. This method of disclosure is not to be interpreted as reflecting an intention that the embodiments of the claimed subject matter require more features than are expressly recited in each claim.

Various changes in the details of the illustrated operational methods are possible without departing from the scope of the claims that follow. For instance, illustrative flow chart steps or process steps of FIG. 3 may perform the identified steps in an order different from that disclosed here. Alternatively, some embodiments may combine the activities described herein as being separate steps. Similarly, one or more of the described steps may be omitted, depending upon the specific operational environment the method is being implemented in.

Other variations and modifications will become apparent to those of ordinary skill in the art once the above disclosure is fully appreciated. For example, although the example managed systems are described as blade servers, such systems are not limited to blade servers or servers in general, and may include any of a wide variety of physical and/or virtual computer systems. Also, the extensibility provided by object framework 300 is not limited to use by the system end-users, and may also be used by the configuration management system 100 providers to implement the functionality delivered with the base configuration management system, or by third-party vendors to provide model definitions and corresponding asset plug-ins as after-market products that augment an existing configuration management system 100. Additionally, although the asset plug-ins are described as shared libraries and/or dynamically linked libraries, other suitable implementations are contemplated, including but not limited to stand-alone executables, as well as tokenized and interpreted programs. It is intended that the following claims be interpreted to include all such variations and modifications.

What is claimed is:

1. A computer system for managing one or more computer resources, comprising:
   a processing unit;
   a storage device, coupled to the processing unit, that stores at least one model definition and one or more asset plug-ins, each of the one or more asset plug-ins configured to expose at least one asset object that represents a computer resource;
   memory, coupled to the processing unit and the storage device, that stores at least one asset model created based at least in part on the at least one model definition; and
   a network interface, coupled to the processing unit, the storage device and the memory and configured to deploy to at least one managed system a compatible asset plug-in of the one or more asset plug-ins, the at least one model definition comprising at least one conditional reference to the compatible asset plug-in;
   wherein if a condition specified within the at least one asset model is satisfied the processing unit selects the compatible asset plug-in for deployment, the condition being defined within the at least one model definition and designated as applicable to the at least one conditional reference.

2. The computer system of claim 1, wherein the at least one model definition comprises a conditional asset model definition and a second condition specified within the at least one asset model that is designated as applicable to the conditional asset model definition, and wherein if the second condition is satisfied the processing unit enables the at least one asset object to be presented for access within a user interface of the computer system.

3. The computer system of claim 1,
   wherein the processing unit creates an asset model element of the at least one asset model based at least in part on a model element definition within the at least one model definition, the asset model element describing an asset object element of the at least one asset object; and
   wherein if a second condition specified within the at least one asset model is satisfied the processing unit enables the asset object element to be presented for access within a user interface of the computer system, the second condition being defined within the at least one model definition and designated as applicable to the model element definition used to create the asset model element.

4. The computer system of claim 1, wherein each of the one or more asset plug-ins comprises one or more functions that implement at least part of a common application program interface (API), and wherein the computer system communicates with a deployed asset plug-in of the one or more asset plug-ins by calling at least one of the one or more functions.

5. The computer system of claim 1,
   wherein the processing unit creates an asset model action of the at least one asset model based at least in part on a model action definition within the at least one model definition, the asset model action describing an action of the at least one asset object performed by a deployed asset plug-in of the one or more plug-ins; and
   wherein if a second condition specified within the at least one asset model is satisfied the processing unit enables the action to be presented as a selectable option within a user interface of the computer system.

6. A method for managing a computer resource, the method comprising:
   importing at least one model definition comprising at least one conditional reference to one or more asset plug-ins and further comprising a condition designated as applicable to the at least one conditional reference, a compatible asset plug-in of the one or more asset plug-ins being compatible with a managed system and further being configured to expose at least one asset object representing a computer resource of the managed system;
   transforming the at least one model definition into at least one asset model;
   deploying the compatible asset plug-in to the managed system if a condition specified within the at least one asset model is satisfied; and
   accessing the at least one asset object to perform operations on the computer resource.

7. The method of claim 6, further comprising enabling the at least one asset object to be presented for access within a user interface of the computer system if a second condition specified within the at least one asset model is satisfied, the at least one model definition comprising a conditional asset model definition and the second condition being designated as applicable to the conditional asset model definition.

8. The method of claim 6, further comprising
   creating an asset model element of the at least one asset model based at least in part on a model element definition within the at least one model definition, the asset model element describing an asset object element of the at least one asset object; and
   enabling the asset object element to be presented for access within a user interface of the computer system if a second condition specified within the at least one asset model is satisfied, the second condition being defined within the at least one model definition and designated as applicable to the model element definition used in creating the asset model element.

9. The method of claim 6, further comprising interacting with the one or more asset plug-ins after being deployed by causing a call to be initiated to at least one of one or more functions that implement at least part of a common application program interface (API), the one or more asset plug-ins comprising the one or more functions.

10. The method of claim 6, further comprising:
    creating an asset model action of the at least one asset model based at least in part on a model action definition within the at least one model definition, the asset model action describing an action of the at least one asset object performed by a deployed asset plug-in of the one or more asset plug-ins; and
    enabling the action to be presented as a selectable option within a user interface of the computer system if a second condition specified within the at least one asset model is satisfied.

11. A computer-readable storage medium comprising software that can be executed on a processor to cause the processor to perform the method of claim 6.

12. A networked computer system comprising a plurality of computers communicatively coupled, at least one of the plurality of computers programmed to perform at least a portion of the method of claim 6, wherein the entire method for managing resources of claim 6 is performed collectively by the plurality of computers.

13. A networked configuration management system, comprising:
- a management station, comprising:
  - a processing unit;
  - a storage device, coupled to the processing unit, that stores at least one model definition and one or more asset plug-ins, each of the one or more asset plug-ins configured to expose at least one asset object;
  - memory, coupled to the processing unit and the storage device, that stores at least one asset model created based at least in part on the at least one model definition; and
  - a network interface, coupled to the processing unit, the storage device and the memory and configured to deploy to at least one managed system a compatible asset plug-in of the one or more asset plug-ins, the at least one model definition comprising at least one conditional reference to the compatible asset plug-in;
- one or more managed systems, including the at least one managed system, that each comprises a computer resource represented by one of the at least one asset objects; and
- a communication network that couples the management station to the one or more managed systems;
- wherein if a condition specified within the at least one asset model is satisfied the processing unit causes the compatible asset plug-in to be deployed to the at least one managed system, the condition being defined within the at least one model definition and designated as applicable to the at least one conditional reference.

14. The networked computer system of claim 13, wherein the at least one model definition comprises a conditional asset model definition and a second condition specified within the at least one asset model that is designated as applicable to the conditional asset model definition, and wherein if the second condition is satisfied the processing unit enables the at least one asset object to be presented for access within a user interface of the computer system.

15. The networked computer system of claim 13,
wherein the processing unit creates an asset model element of the at least one asset model based at least in part on a model element definition within the at least one model definition, the asset model element describing an asset object element of the at least one asset object; and
wherein if a second condition specified within the at least one asset model is satisfied the processing unit enables the asset object element to be presented for access within a user interface of the computer system, the second condition being defined within the at least one model definition and designated as applicable to the model element definition used to create the asset model element.

16. The networked computer system of claim 13, wherein each of the one or more asset plug-ins comprises one or more functions that implement at least part of a common application program interface (API), and wherein the computer system communicates with a deployed asset plug-in of the one or more asset plug-ins by calling at least one of the one or more functions.

17. The networked computer system of claim 16, the at least one managed systems further comprising:
- a second processing unit;
- a second network interface, coupled to the second processing unit, that receives the compatible asset plug-in from the management station; and
- a second storage device, coupled to the second processing unit and the second network interface, that stores the received compatible asset plug-in;
- wherein the second processing unit registers the received compatible asset plug-in with an operating system executing on the at least one managed systems and causes the received compatible asset plug-in to respond to calls to the one or more functions.

18. The networked computer system of claim 13,
wherein the processing unit creates an asset model action of the at least one asset model based at least in part on a model action definition within the at least one model definition, the asset model action describing an action of the at least one asset object performed by a deployed asset plug-in of the one or more plug-ins; and
wherein if a second condition specified within the at least one asset model is satisfied the processing unit enables the action to be presented as a selectable option within a user interface of the computer system.

* * * * *

UNITED STATES PATENT AND TRADEMARK OFFICE
CERTIFICATE OF CORRECTION

| | | |
|---|---|---|
| PATENT NO. | : 7,996,500 B2 | Page 1 of 1 |
| APPLICATION NO. | : 12/634614 | |
| DATED | : August 9, 2011 | |
| INVENTOR(S) | : Hayim Kobi et al. | |

It is certified that error appears in the above-identified patent and that said Letters Patent is hereby corrected as shown below:

On the Title page, in field (75), in "Inventors", in column 1, line 1-2, delete "Jon Whitney," and insert -- Jonathan Whitney, --, therefor.

Signed and Sealed this
Fifteenth Day of November, 2011

David J. Kappos
*Director of the United States Patent and Trademark Office*